US012571452B2

(12) United States Patent
Kondo et al.

(10) Patent No.: US 12,571,452 B2
(45) Date of Patent: Mar. 10, 2026

(54) LIQUID-FILLED VIBRATION DAMPING DEVICE

(71) Applicant: SUMITOMO RIKO COMPANY LIMITED, Komaki (JP)

(72) Inventors: Hiroki Kondo, Komaki (JP); Kenji Oki, Komaki (JP)

(73) Assignee: Sumitomo Riko Company Limited, Komaki (JP)

( * ) Notice: Subject to any disclaimer, the term of this patent is extended or adjusted under 35 U.S.C. 154(b) by 485 days.

(21) Appl. No.: 18/076,484

(22) Filed: Dec. 7, 2022

(65) Prior Publication Data

US 2023/0272836 A1     Aug. 31, 2023

(30) Foreign Application Priority Data

Feb. 25, 2022     (JP) ................................. 2022-027819

(51) Int. Cl.
    *F16F 13/10*          (2006.01)
    *B60K 5/12*           (2006.01)
    *F16F 15/023*         (2006.01)
(52) U.S. Cl.
    CPC ............ *F16F 13/10* (2013.01); *F16F 13/103* (2013.01); *F16F 13/108* (2013.01); *F16F 15/023* (2013.01); *B60K 5/1208* (2013.01)
(58) Field of Classification Search
    CPC ........ F16F 13/10; F16F 13/103; F16F 13/108; F16F 15/022; F16F 15/023; B60K 5/1208
    (Continued)

(56) References Cited

U.S. PATENT DOCUMENTS 4,915,643 A * 4/1990 Samejima .......... H01R 13/6272
                                                             439/357
4,925,398 A * 5/1990 Samejima .......... H01R 13/6272
                                                             439/350
(Continued)

FOREIGN PATENT DOCUMENTS

CN          213393302 U     6/2021
JP          2008-180337 A   8/2008
            (Continued)

OTHER PUBLICATIONS

JP-2008180337-A (Year: 2008).*
(Continued)

*Primary Examiner* — Thomas J Williams
(74) *Attorney, Agent, or Firm* — Oliff PLC

(57) ABSTRACT

A liquid-filled vibration damping device including a first and second attachment members elastically connected by a main rubber elastic body, and a liquid chamber sealed by a closure member attached to the second attachment member from below with a seal member interposed therebetween. The second attachment member and the closure member are attached to each other by connecting locks arranged in a circumferential direction. Each connecting lock includes a flexible locking piece projecting from one toward another of the second attachment member and the closure member while having a locking hole, and a locking claw formed on the other of the two members and hooked to the locking hole of the locking piece. The locking piece includes a guide groove extending linearly from the locking hole in a direction of projection to guide the locking claw into the locking hole.

5 Claims, 11 Drawing Sheets

(58) Field of Classification Search
USPC ........................................... 403/329; 439/357
See application file for complete search history.

(56) References Cited

U.S. PATENT DOCUMENTS

| | | | | |
|---|---|---|---|---|
| 8,403,097 B2 * | 3/2013 | Joly | ........................ | F16F 1/373 |
| | | | | 267/140.13 |
| 9,982,744 B2 | 5/2018 | Kadowaki | | |
| 2017/0284501 A1 | 10/2017 | Kadowaki | | |
| 2018/0320753 A1 * | 11/2018 | Beckmann | ........... | B60K 5/1208 |
| 2019/0366825 A1 * | 12/2019 | Kim | .................... | B60K 5/1233 |
| 2019/0366826 A1 * | 12/2019 | Kim | .................... | B60K 5/1208 |
| 2023/0272836 A1 * | 8/2023 | Kondo | .................. | F16F 13/103 |

FOREIGN PATENT DOCUMENTS

| | | | | |
|---|---|---|---|---|
| JP | 2009092137 A | * | 4/2009 |
| JP | 2009-209993 A | | 9/2009 |
| JP | 2015-096763 A | | 5/2015 |
| JP | 2017-180779 A | | 10/2017 |
| JP | 2020-051411 A | | 4/2020 |
| WO | WO-2020110357 A1 | * | 6/2020 |

OTHER PUBLICATIONS

Jun. 19, 2025 Office Action issued in Japanese Application No. 2022-027819.
Oct. 22, 2025 Office Action issued in Japanese Application No. 2022-027819.
Jan. 8, 2026 Office Action issued in Chinese Application No. 202310046341.1.

* cited by examiner

FIG.16A
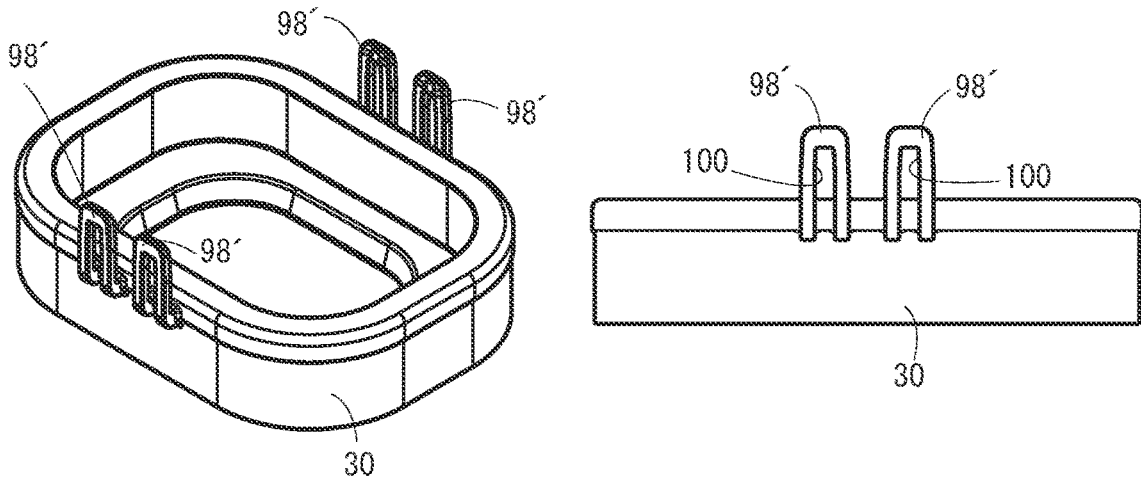
FIG.16B
FIG.16C
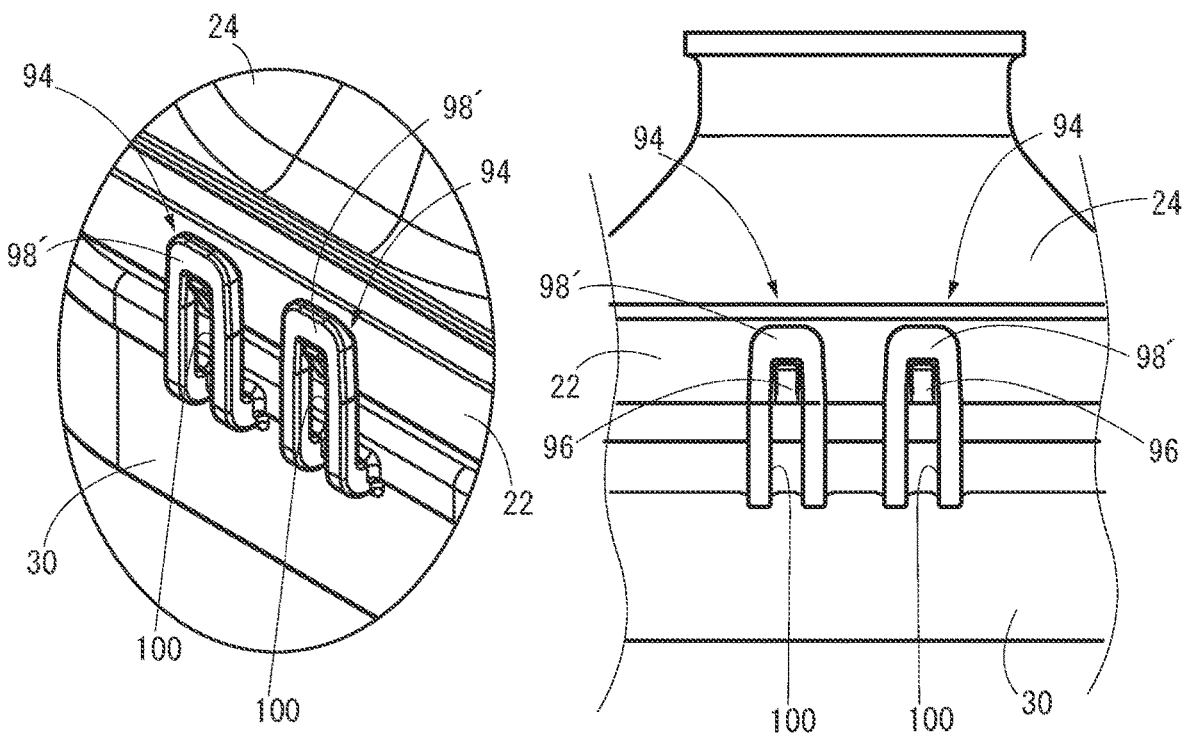
FIG.16D

LIQUID-FILLED VIBRATION DAMPING DEVICE

INCORPORATED BY REFERENCE

The disclosure of Japanese Patent Application No. 2022-027819 filed on Feb. 25, 2022 including the specification, drawings and abstract is incorporated herein by reference in its entirety.

BACKGROUND ART

1. Technical Field

The present disclosure relates generally to a vibration damping device applied to an automotive engine mount or the like, and more particularly to a liquid-filled vibration damping device including a liquid chamber.

2. Description of the Related Art

Conventionally, as one type of a vibration damping device used for an automotive engine mount or the like, there is known a liquid-filled vibration damping device including a liquid chamber that is sealed off from the external space, and configured to achieve improvement in vibration damping ability by utilizing flow action of a liquid or the like that occurs when vibration is input.

In such a liquid-filled vibration damping device, as described in U.S. Pat. No. 9,982,744 B2, for example, in a vibration-damping device main unit in which a first attachment member and a second attachment member are connected by a main rubber elastic body, a closure member is overlapped on and attached to the second attachment member from below with a seal member interposed therebetween. Then, a recess for a liquid chamber formed inside the main rubber elastic body and opening downward through the second attachment member is covered with a lid member such as a diaphragm rubber supported by the closure member and is sealed by the overlapped portion of the second mounting member and the closure member, thereby providing a sealed liquid chamber.

Meanwhile, the attachment of the closure member to the second attachment member can be achieved by fastening with bolts or the like or by metal clinching. However, from the perspective of simplifying the structure, facilitating the manufacture, and the like, it is preferable to adopt a locking mechanism by hooking using an elastic hook or the like as described in U.S. Pat. No. 9,982,744 B2. Such a locking mechanism includes, for example, a plurality of sets of an approximately U-shaped flexible locking piece projecting from one of the second attachment member and the closure member toward the other, and a locking claw formed on the other of the second attachment member and the closure member and hooked to a locking hole of the locking piece which are provided at positions corresponding to each other in the circumferential direction.

However, it has been revealed that the conventional liquid-filled vibration damping device as described in U.S. Pat. No. 9,982,744 B2, which adopts such a locking mechanism, has problems that should be improved. That is, when the closure member is attached to the second attachment member, the locking piece projecting from the one to the other and the locking claw first come into contact with each other. Here, due to a dimensional error or the like, the plurality of sets of locking pieces and locking claws may not come into contact with each other at the same time, or the locking pieces and locking claws may come into contact with each other while being mutually mispositioned. If there is such a contact failure between the locking pieces and the locking claws, there is a risk that the second attachment member and the closure member may be mutually mispositioned thereby making it difficult to stably exhibit good sealing performance, or the locking claw may not be properly hooked to the locking hole whereby the locking piece or the locking claw may be damaged.

In order to address such a problem, it was also examined to align the second attachment member and the closure member with high accuracy using a jig when attaching the two members. However, in addition to the need for a large-sized jig with high dimensional accuracy, it is also necessary to position the jig and set each member on the jig, which inevitably complicates the manufacturing process. For this reason, it is difficult to say the alignment of the two members using such a jig is practical, because it may possibly hamper even the original effect of adopting the locking piece and the locking claw that enables the attachment of the closure member to the second attachment member in a simple step by employing a special locking mechanism in which the locking claw is locked by being hooked to the locking hole of the locking piece.

SUMMARY

It is therefore one object of the present disclosure to provide a liquid-filled vibration damping device of novel structure which is able to improve accuracy and stability in alignment of the second attachment member and the closure member without hampering the simple attachment of the second attachment member and the closure member using the locking mechanism in which the locking claw is locked by being hooked to the locking hole of the locking piece, and which enables attachment of the second attachment member and the closure member with high accuracy and is able to achieve stable sealing performance of the liquid chamber by reliably hooking the locking claw to the locking hole of the locking piece while avoiding damage to the locking piece and the locking claw or the like.

The above and/or optional objects of the present disclosure may be attained according to at least one of the following preferred embodiments of the disclosure. The following preferred embodiments and/or elements employed in each preferred embodiment of the disclosure may be adopted at any possible optional combinations.

A first preferred embodiment of the present disclosure is as described below.

A liquid-filled vibration damping device comprising:

a first attachment member and a second attachment member that are vertically remote from each other and are elastically connected by a main rubber elastic body; and a closure member overlapped on and attached to the second attachment member from below with a seal member interposed therebetween to define and seal a liquid chamber, wherein the second attachment member and the closure member are attached to each other by a plurality of connecting locks arranged in a circumferential direction, each of the plurality of connecting locks includes:

a flexible locking piece projecting from one toward another of the second attachment member and the closure member, the flexible locking piece being elastically deformable radially outward and having at least one locking hole; and a locking claw formed on the other of the second attachment member and the closure member and hooked to the locking hole of the flexible locking piece, and the flexible locking piece is provided with a guide groove extending linearly from the locking hole in a direction of projection to guide the locking claw into the locking hole.

When examining the alignment of the second attachment member and the closure member during the attachment, the present inventors focused on that the locking piece and the locking claw that constitute the connecting lock are provided in pairs and arranged in the circumferential direction, and that when the second attachment member and the closure member are brought closer to each other in the direction of overlapping, the locking piece and the locking claw come into contact and interfere with each other first. That is, the inventors thought that since the connecting locks are provided at a plurality of locations in the circumferential direction, if the locking piece and the locking claw are properly aligned with each other in the plurality of connecting locks, the second attachment member and the closure member can naturally be set to the proper position of mutual combination in the horizontal direction. Moreover, the locking piece and the locking claw come into contact with each other first during the attachment of the second attachment member and the closure member. Thus, the inventors thought that if the locking piece and the locking claw are provided with a guide function to self-align themselves in a proper position due to mutual interference, it would be possible to efficiently guide the second attachment member and the closure member to their proper mutual positions in the initial stage of attachment, which is before the second attachment member and the closure member are overlapped with the seal member firmly interposed therebetween and in which the second attachment member and the closure member are readily moved relative to each other in the horizontal direction.

With the liquid-filled vibration damping device of the present preferred embodiment, which is attained based on such a novel point of view, the second attachment member and the closure member can be easily attached to each other by a simple attachment mechanism without requiring a special jig for attachment or the like. Moreover, when attaching the closure member to the second attachment member, it is possible to efficiently align the second attachment member and the closure member with each other in the horizontal direction by skillfully utilizing the connecting lock. Besides, since the guide mechanism guides the locking claw into the state of being hooked to the locking hole, the locking piece and the locking claw are prevented from being poorly hooked. Thus, the attachment of the second attachment member and the closure member by the connecting lock can be realized with high precision and stability, so that the sealing performance of the liquid chamber can be stably exhibited. In addition, it is possible to avoid damage to the connecting lock etc. caused by the locking piece overriding the locking claw and being distorted or the like.

A second preferred embodiment of the present disclosure is as described below.

The liquid-filled vibration damping device according to the first preferred embodiment, wherein the locking claw projects radially outward from the other of the second attachment member and the closure member, and the guide groove of the flexible locking piece is formed on an inside surface of a distal end portion of the flexible locking piece.

With the liquid-filled vibration damping device of the present preferred embodiment, when the locking claw is hooked to the locking hole to attach the second attachment member and the closure member, the locking piece that overrides the locking claw will be elastically deformed to curve radially outward. This makes it possible to easily obtain a sufficient deformation space for the locking piece.

A third preferred embodiment of the present disclosure is as described below.

The liquid-filled vibration damping device according to the first or second preferred embodiment, wherein groove inner faces on opposite sides of the guide groove of the flexible locking piece constitute expanded guide surfaces such that a groove width dimension is made larger at a groove opening than at a groove bottom face.

With the liquid-filled vibration damping device of the present preferred embodiment, the groove width of the guide groove is increased toward the groove opening side. Thus, when the second attachment member and the closure member are mutually attached, even if the locking claw and the locking piece are misaligned with each other, the locking claw can easily enter the guide groove. Moreover, the groove inner faces on the opposite sides of the guide groove constitute the sloping expanded guide surfaces. Thus, when the second attachment member and the closure member are mutually attached, contact reaction force of the locking claw on the guide surface can efficiently realize mutual alignment between the locking claw and the locking piece.

A fourth preferred embodiment of the present disclosure is as described below.

The liquid-filled vibration damping device according to any of the first to third preferred embodiments, wherein the locking claw has a tapered projecting shape whose width dimension is made smaller at a distal end than at a proximal end in a direction of projection.

With the liquid-filled vibration damping device of the present preferred embodiment, since the locking claw has a tapered projecting shape, when the second attachment member and the closure member are mutually attached, even if the locking claw and the locking piece are misaligned with each other, the locking claw can easily enter the guide groove. Moreover, the outer faces on the opposite sides of the locking claw constitute sloping faces that slope so as to approach each other toward the projecting distal end side. Thus, when the second attachment member and the closure member are mutually attached, contact reaction force of the sloping face on the groove inner face of the guide groove can efficiently realize mutual alignment between the two members.

A fifth preferred embodiment of the present disclosure is as described below.

The liquid-filled vibration damping device according to any of the first to fourth preferred embodiments, wherein the flexible locking piece has a single-piece structure in which the at least one locking hole comprises a plurality of locking holes that are spaced apart from each other in the circumferential direction.

With the liquid-filled vibration damping device of the present preferred embodiment, it is possible to improve the member strength and deformation stability of the flexible locking piece overall, as well as to achieve a simple structure and ease of manufacture of the flexible locking piece that realizes the plurality of locking holes.

A sixth preferred embodiment of the present disclosure is as described below.

The liquid-filled vibration damping device according to any of the first to fourth preferred embodiments, wherein the flexible locking piece has a separate structure in which at least one locking hole comprises a single locking hole.

With the liquid-filled vibration damping device of the present preferred embodiment, the locking piece can be formed corresponding to each locking claw with a mode in which each locking piece includes a single locking hole. This makes it possible to improve the degree of freedom of arrangement mode of the locking piece and the locking claw, as well as to achieve improvement in deformation characteristics of the locking pieces or the like. Thus, for example, it is easy to establish a large thickness of the component while reliably obtaining the deformation characteristics required of the locking piece or the like.

According to the present disclosure, the second attachment member and the closure member can be attached to each other by the connecting lock without requiring a special jig for attachment or the like. Also, it is possible to effectively align the second attachment member and the closure member with each other in the horizontal direction by skillfully utilizing the connecting lock, thereby attaching the closure member to the second attachment member. Besides, the locking piece and the locking claw are prevented from being poorly hooked or the like, so that the sealing performance of the liquid chamber can be stably exhibited, and damage to the connecting lock or the like can be avoided.

BRIEF DESCRIPTION OF THE DRAWINGS

The foregoing and/or other objects, features and advantages of the disclosure will become more apparent from the following description of a practical embodiment with reference to the accompanying drawings in which like reference numerals designate like elements and wherein:

FIG. 3 is a cross sectional view taken along line 3-3 of FIG. 2;

FIG. 4 is a cross sectional view taken along line 4-4 of FIG. 2;

FIG. 5 is a cross sectional view taken along line 5-5 of FIG. 2;

6

Figure 6:
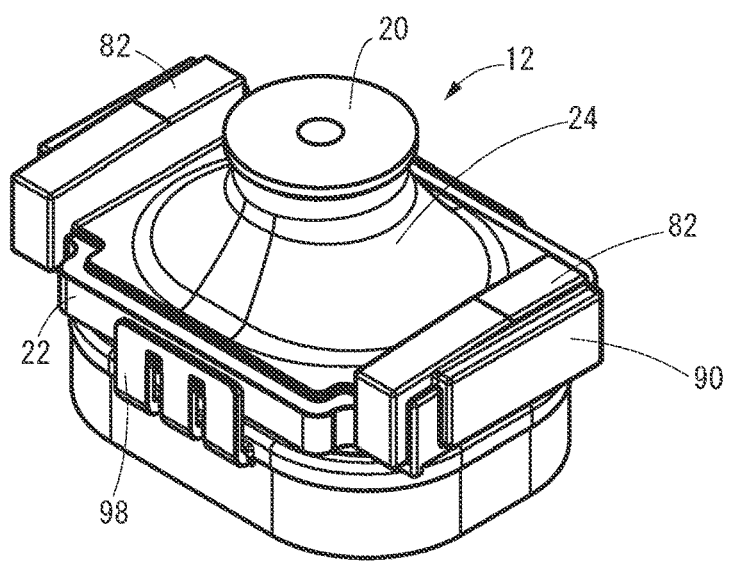
FIG. 6 is an overall perspective view showing the mount main unit as the first practical embodiment of the present disclosure, which constitutes the engine mount shown in FIG. 1, in isolation.
Figure 7:
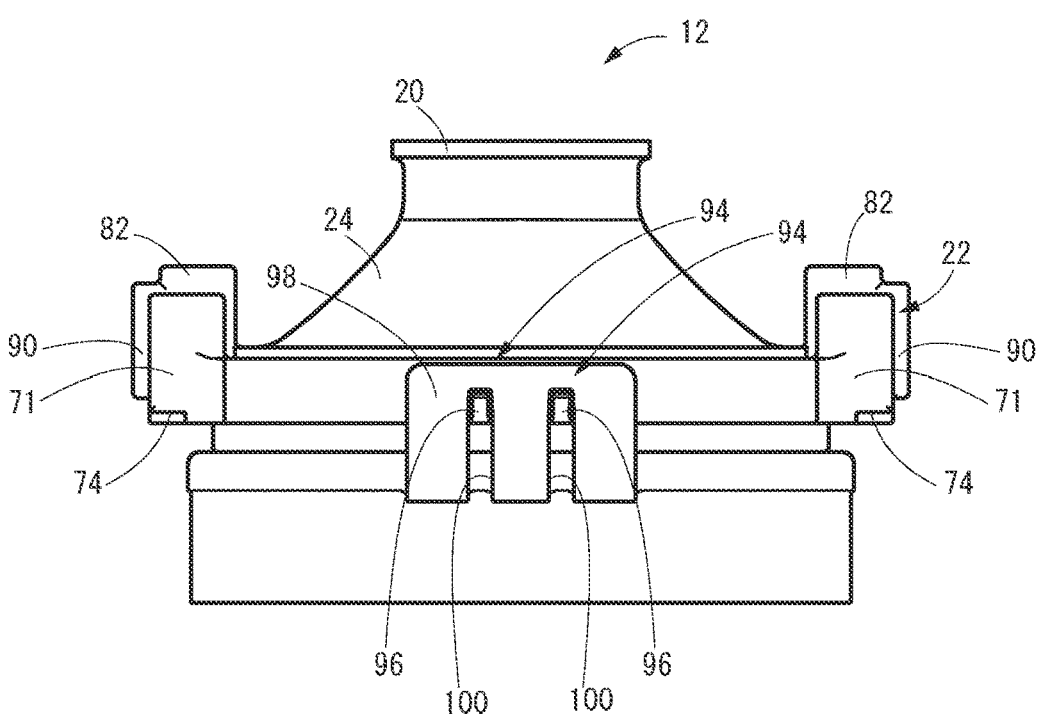
FIG. 7 is a front view of the mount main unit shown in FIG. 6.
Figure 8:
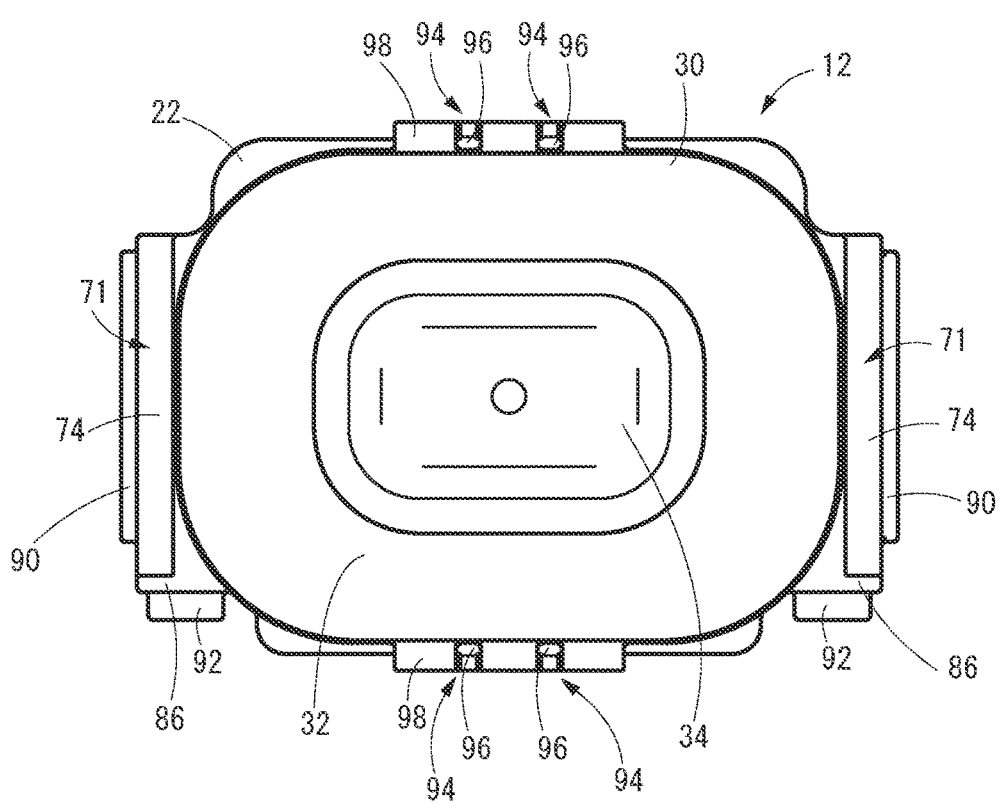
FIG. 8 is a bottom plan view of the mount main unit shown in FIG. 6.
Figure 9:
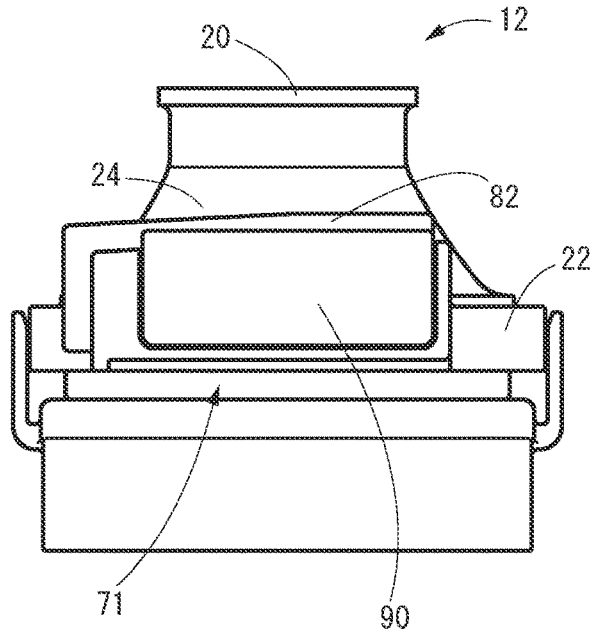
FIG. 9 is a left side view of the mount main unit shown in FIG. 6.
Figure 11:
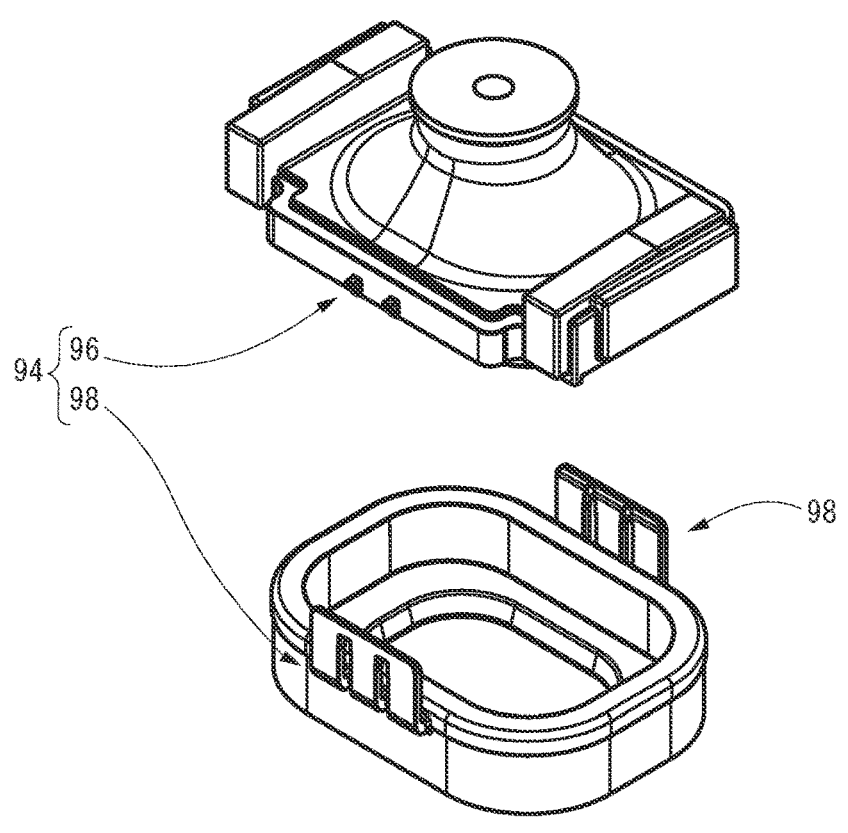
FIG. 11 is a perspective view suitable for explaining an attachment structure of a second attachment member (an integrally vulcanization molded component of a main rubber elastic body) and a closure member by a connecting lock in the mount main unit shown in FIG. 6.
Figure 12:
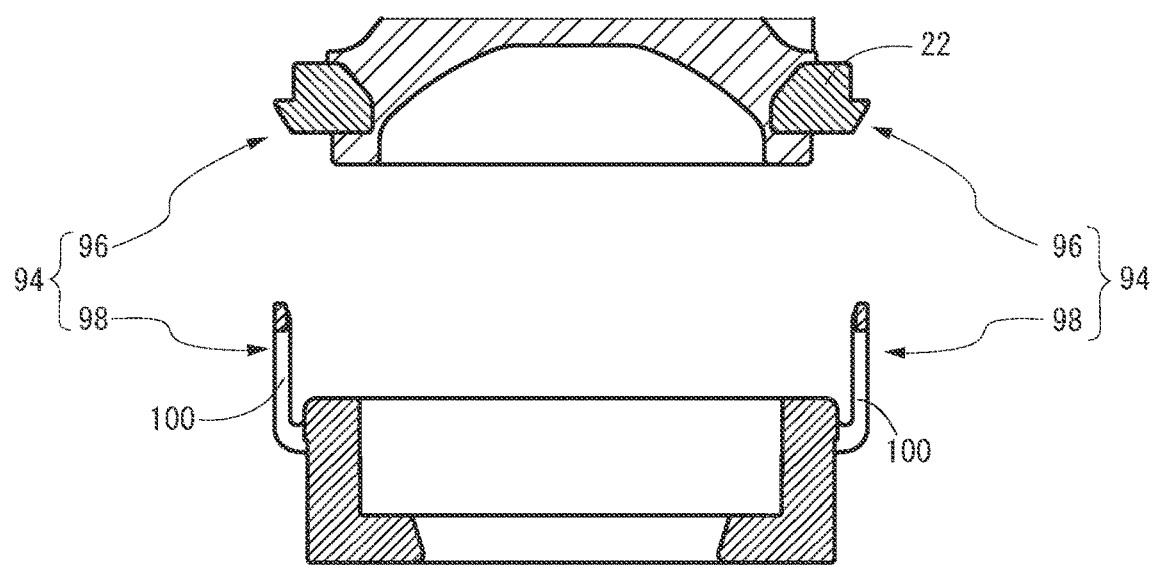
Figure 13A:
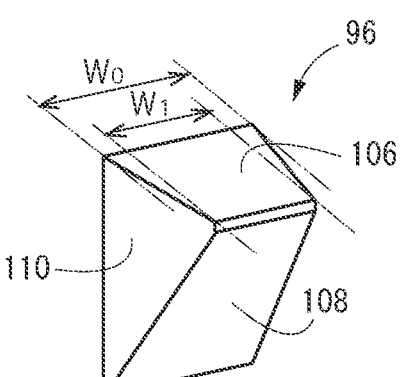
Figure 13B:
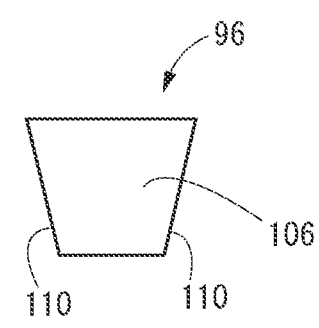
Figure 13C:
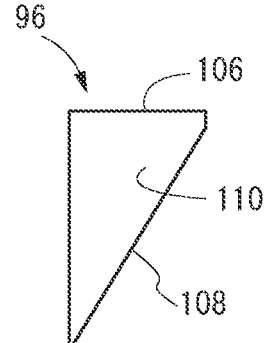
Figure 13D:
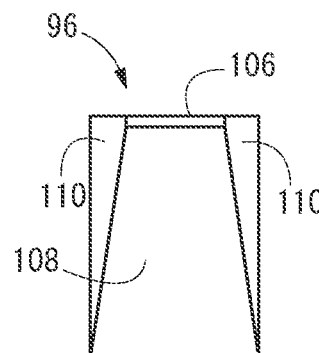
Figure 14A:
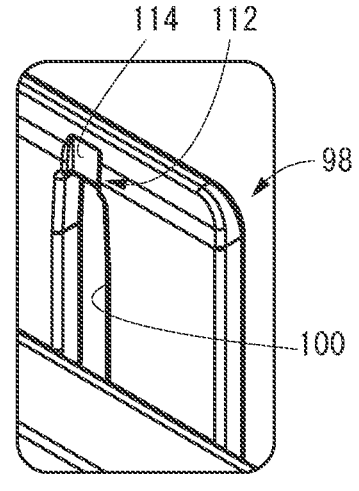
Figure 14B:
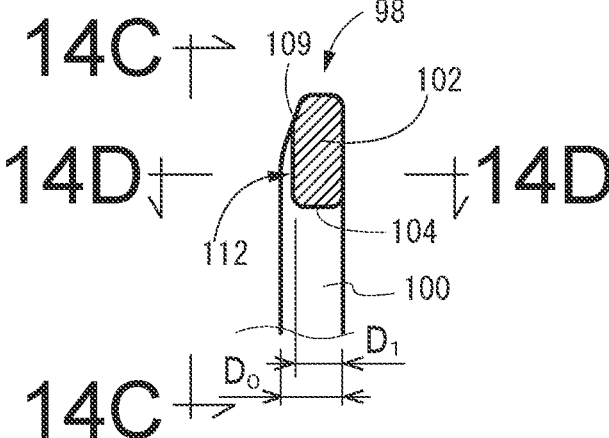
Figure 14C:
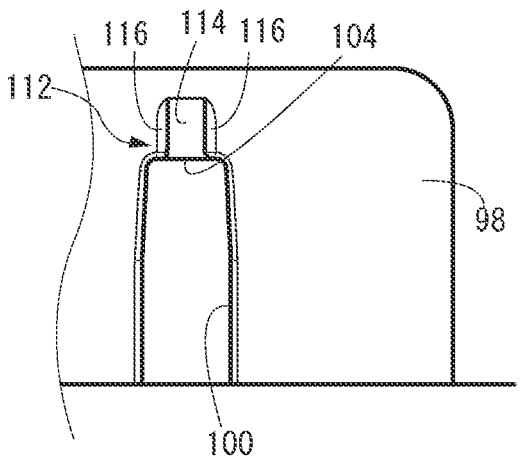
Figure 14D:
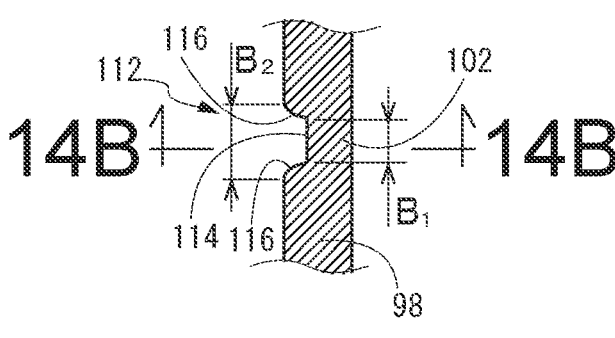
Figure 15A:
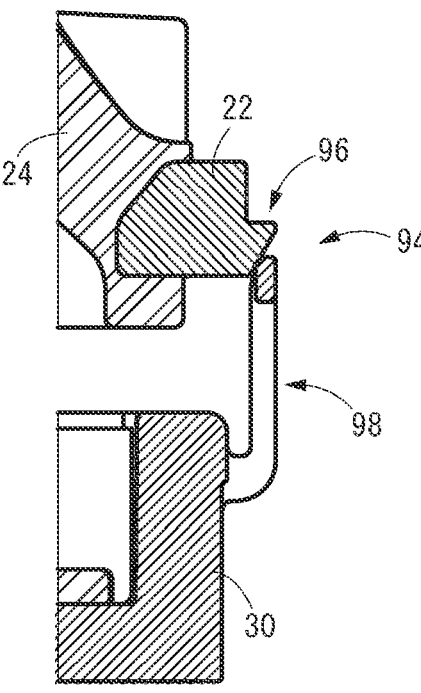
Figure 15B:
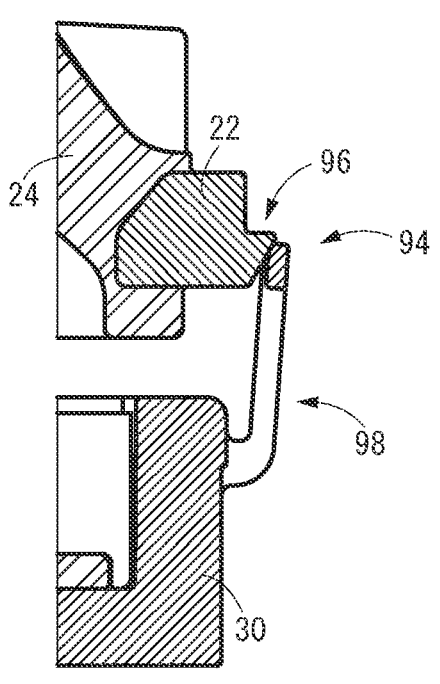
Figure 15C:
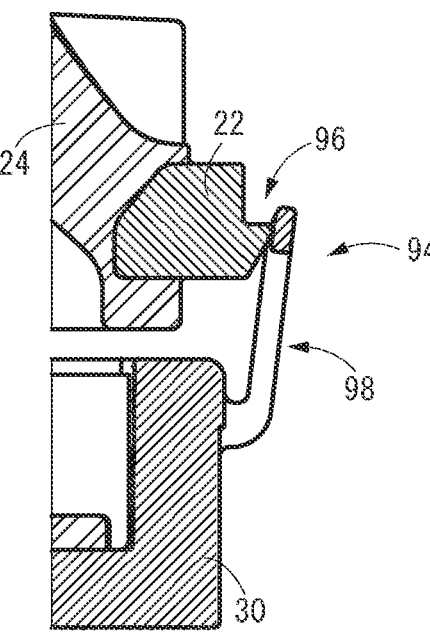
Figure 15D:
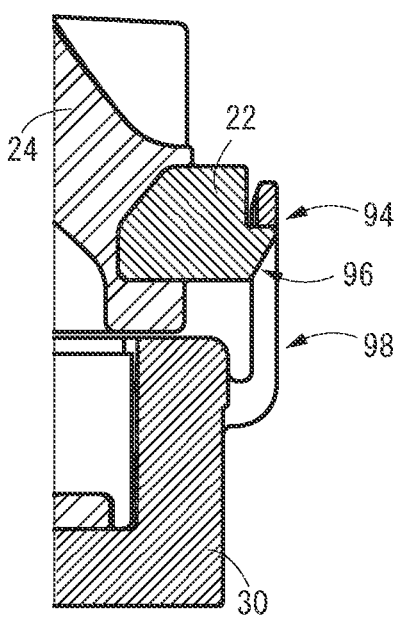

FIG. 12 is a vertical cross sectional view suitable for explaining the attachment structure of the second attachment member and the closure member by the connecting lock shown in FIG. 11;

FIGS. 13A-13D are diagrammatic enlarged views suitable for explaining a locking claw constituting the connecting lock shown in FIG. 12;

FIGS. 14A-14D are enlarged views suitable for explaining the locking claw constituting the connecting lock shown in FIG. 12, wherein FIG. 14A is a perspective view, FIG. 14B is a cross sectional view taken along line 14B-14B of FIG. 14D, FIG. 14C is a view as seen in a direction indicated by arrow 14C-14C of FIG. 14B, and FIG. 14D is a cross sectional view taken along line 14D-14D of FIG. 14B;

FIGS. 15A-15D are views suitable for explaining attachment of the second attachment member and the closure member by the connecting lock shown in FIG. 12; and FIGS. 16A-16D are views suitable for illustrating another embodiment of the connecting lock adoptable in the mount main unit shown in FIG. 6.

DETAILED DESCRIPTION

Hereinafter, practical embodiments of the present disclosure will be described in reference to the drawings.

FIGS. 1 to 5 depict an automotive engine mount 10. The engine mount 10 is constituted by a mount main unit 12, which serves as a first practical embodiment of a liquid-filled vibration damping device constructed according to the present disclosure, being attached to a bracket 14 configured to be attached to the vehicle body side.

Figure 2:
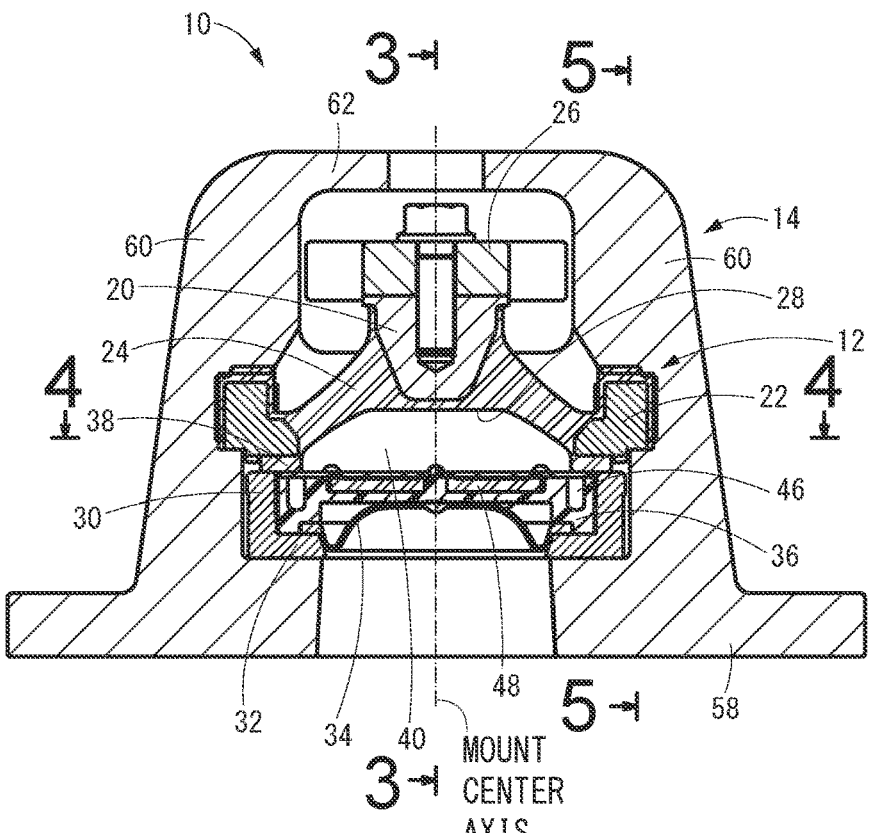
FIG. 2 is a vertical cross sectional view of the engine mount shown in FIG. 1, taken along line 2-2 of FIG. 4.

In the following description, as a general rule, the vertical direction refers to the vertical direction in FIG. 2, which is the direction along the mount center axis. Besides, it is assumed that the engine mount 10 of the present practical embodiment is installed between a body and a power unit of an automobile with the vertical direction in FIG. 2 being coincident with the vertical direction, the left-right direction in FIG. 2 being coincident with the vehicle front-back direction, and the direction perpendicular to the paper surface in FIG. 2 being coincident with the vehicle left-right direction. However, in order to make it easier to understand the drawings, in the following explanation, the left-right direction in FIG. 2 refers to the mount left-right direction, and the direction perpendicular to the paper surface in FIG. 2 refers to the mount front-back direction (or the far/near direction). In each figure, each rubber elastic body (the urging rubber) provided on the mount main unit 12 is shown as it is before attachment to the bracket 14, in order to make it easier to see whether or not the urging rubber is compressed when attached to the bracket 14.

Described more specifically, the mount main unit 12 has a structure in which a first attachment member 20 and a second attachment member 22 are elastically connected by a main rubber elastic body 24, as shown in FIGS. 6 to 9 in isolation in addition to FIGS. 1 to 5. A support load and a vibration of the power unit will be input across the first attachment member 20 and the second attachment member 22.

Figure 1:
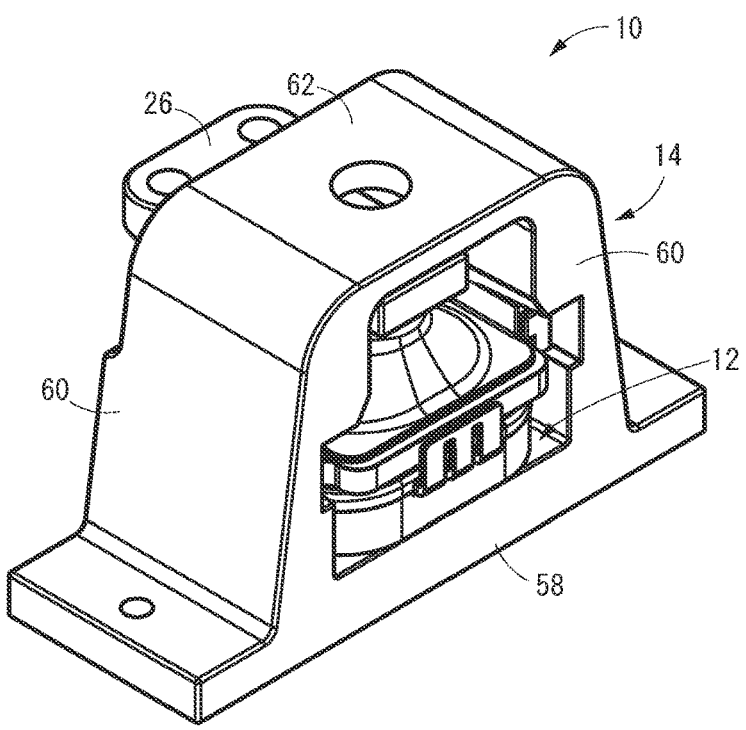
FIG. 1 is a perspective view showing an entire engine mount constituted by attaching a liquid-filled vibration damping device in the form of a mount main unit as a first practical embodiment of the present disclosure to a bracket.
Figure 3:
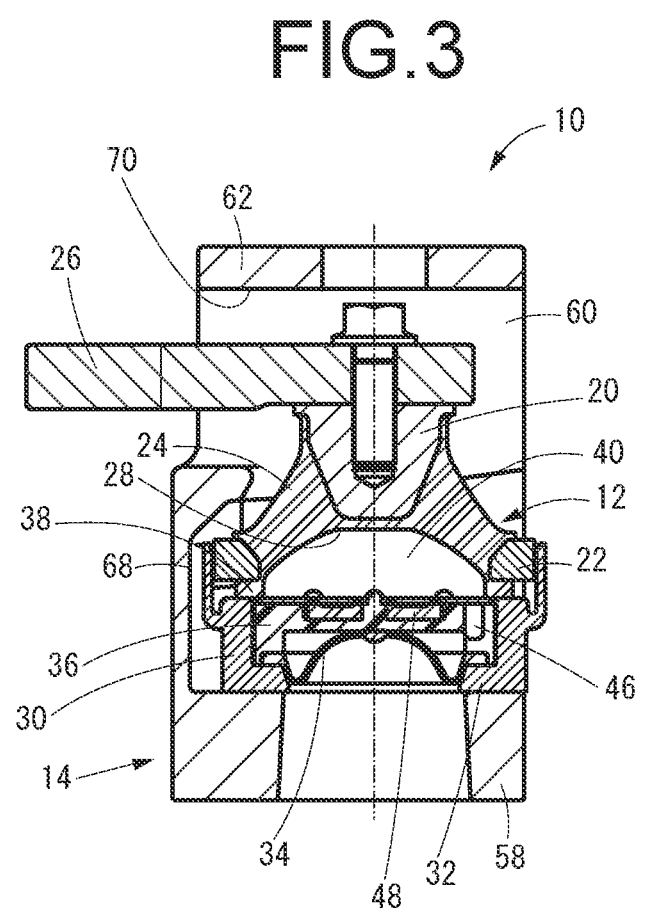

The first attachment member 20 is a high rigidity component made of metal, or fiber-reinforced resin, or the like, and has a solid block structure such as a vertically inverted frustoconical shape. As illustrated in FIGS. 1 to 3, an attachment part 26 configured to be attached to the power unit side is fixed to the first attachment member 20 with a fixing bolt or the like.

Figures 4, 5:
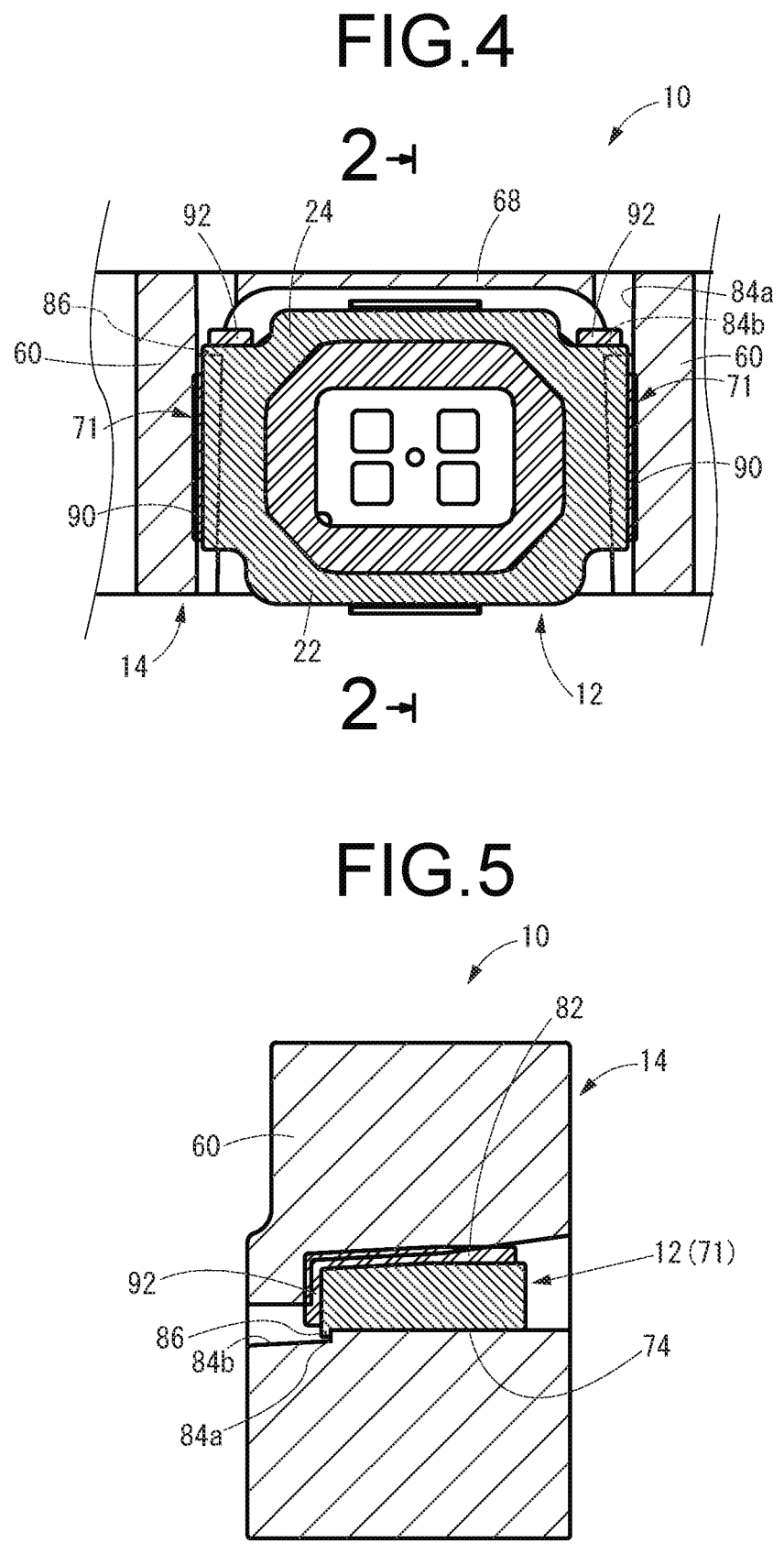

The second attachment member 22 is a high rigidity component made of metal such as aluminum alloy, or fiber-reinforced resin, or the like and has an approximately thick-walled annular block shape overall. In the present practical embodiment in particular, as can be seen in FIG. 4, the second attachment member 22 includes a rounded rectangular through hole in the center, and has an approximately rectangular, thick-walled annular block shape overall.

The main rubber elastic body 24 elastically connecting the first attachment member 20 and the second attachment member 22 has an approximately oval shape or a rounded rectangular shape in the circumferential direction, and has an outer peripheral surface shape whose outer diameter dimension (the peripheral length) gradually becomes smaller from the bottom to the top. The first attachment member 20 is fastened to the upper-end, small-diameter portion of the main rubber elastic body 24 in an approximately embedded state so as to be inserted therein, while the second attachment member 22 is fastened to the lower-end, large-diameter outer peripheral portion thereof. The main rubber elastic body 24 desirably takes the form of an integrally vulcanization molded component incorporating the first and second attachment members 20, 22.

The main rubber elastic body 24 is provided with an inverted recess 28 that opens in the center of the lower face; and the recess 28 opens downward through the through hole of the second attachment member 22. Besides, a closure member 30 is overlapped on and attached to the second attachment member 22 from below.

The closure member 30 is made of a rigid, synthetic resin material or the like, and has an approximately thick-walled annular block shape corresponding to the second attachment member 22. In addition, the closure member 30 includes a support base part 32 protruding inward from the lower end, and the cross-sectional shape of the closure member 30 has an approximately L shape. A flexible film 34 and an orifice member 36 are inserted into the closure member 30 from above, and attached thereto in a housed state so as to be overlapped on the support base part 32. The flexible film 34 and the orifice member 36 are vertically sandwiched and fixedly supported between the second attachment member 22 and the closure member 30 at their outer peripheral portions.

On the upper side of the closure member 30, the space between the second attachment member 22 on one side and the closure member 30 and the orifice member 36 on the other is sealed by a sealing rubber 38 serving as a seal member, which is provided on the lower face of the second attachment member 22, being interposed therebetween. Further, on the lower side of the closure member 30, the space between the closure member 30 and the orifice member 36 is sealed by vertically sandwiching the outer peripheral portion of the flexible film 34.

With this configuration, the recess 28 of the main rubber elastic body 24 is covered with the flexible film 34 and is liquid-tightly sealed, thereby defining a liquid chamber 40 filled with a predetermined liquid. Besides, the liquid chamber 40 is vertically partitioned by the approximately plate-shaped orifice member 36. On the upper side of the orifice member 36, formed is a pressure-receiving chamber whose wall is partly constituted by the main rubber elastic body 24, and in which pressure fluctuations arise due to the vibration input. On the lower side of the orifice member 36, formed is a variable-capacity equilibrium chamber whose wall is partly constituted by the flexible film 34 such as a diaphragm rubber thereby absorbing pressure fluctuations.

The pressure-receiving chamber and the equilibrium chamber communicates with each other through an orifice passage 46 provided in the orifice member 36, so that a vibration damping effect will be exhibited by utilizing the flow action of the fluid flowing through the orifice passage 46 when vibration is input. In the present practical embodiment, a housing area is formed so as to be located in the central portion of the orifice member 36 and to spread in the direction orthogonal to the mount center axis, and communicates with each of the pressure-receiving chamber and the equilibrium chamber. The movable film 48 is housed within the housing area. For example, during input of a vibration in a high-frequency range, which exceeds the tuning frequency of the orifice passage 46, the pressure fluctuations in the pressure-receiving chamber will be reduced or absorbed based on deformation or displacement of the movable film 48, thereby avoiding a significant development of high dynamic spring.

The specific structure of the liquid chamber 40, the tuning characteristics of the orifice passage 46, presence or absence of the high-frequency liquid pressure absorption mechanism by the movable film 48, and the like are not limited, but can be appropriately set depending on the required vibration damping characteristics.

The mount main unit 12 having such a structure is inserted into the bracket 14 forward of the mount from the lateral side, so as to be attached by so-called lateral insertion.

Figure 10:
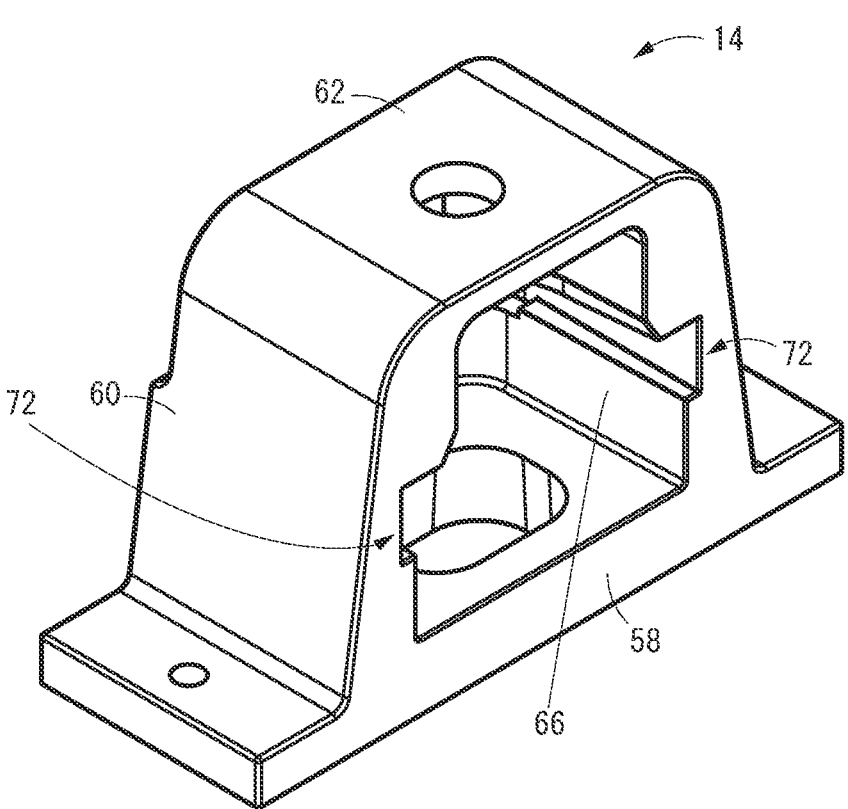
FIG. 10 is an overall perspective view showing the bracket constituting the engine mount shown in FIG. 1 in isolation.

The bracket 14 is a high rigidity component made of metal such as aluminum alloy, or fiber-reinforced resin, or the like. As shown in FIG. 10 in isolation in addition to FIGS. 1 to 5, the bracket 14 integrally includes left and right attachment leg parts 60, 60 rising upward from the upper face of a base part 58 having a rectangular flat-plate shape, and a top plate part 62 integrally connecting the upper ends of the left and right attachment leg parts 60, 60. An installation space 66 in which the mount main unit 12 is attached is formed so as to open to the lateral side in a state of being surrounded by the base part 58, the left and right attachment leg parts 60, 60, and the top plate part 62.

A far wall 68 is integrally provided on the far side of the installation space 66 (the side opposite to the laterally opening side) so as to close the opening of the installation space 66. Besides, an insertion hole 70 through which the attachment part 26 is inserted for attachment to the mount main unit 12 (the first attachment member 20) in the upper portion of the far wall 68. The opposite sides of the base part 58 constitute fixing plate parts extending outward from the respective attachment leg parts 60, and the bracket 14 is configured to be fixed by bolting to the vehicle body side at the pair of fixing plate parts.

The left and right attachment leg parts 60, 60 are thick-walled plates having a predetermined width dimension in the front-back direction, and are opposed to each other in the left-right direction. The mount main unit 12 inserted from the lateral side into the installation space 66 is attached with the left and right opposite edges of the second attachment member 22 fixedly supported by the left and right attachment leg parts 60, 60.

That is, the second attachment member 22 of the mount main unit 12 is provided with a pair of connecting parts 71, 71 extending linearly in the front-back direction while each having an approximately constant thickness at the outer peripheral portions on the left and right opposite sides. On the other hand, with the mount main unit 12 attached to the bracket 14, the left and right attachment leg parts 60, 60 of the bracket 14 are provided with connecting grooves 72, 72 positioned in the middle portion in the height direction by utilizing these connecting parts 71, 71. The connecting grooves 72, 72 open onto the opposed inner faces and extend in the front-back direction. Then, the pair of connecting parts 71, 71 provided to the second attachment member 22 are inserted into the pair of connecting grooves 72, 72 from the lateral side, and the mount main unit 12 is laterally inserted into and attached to the bracket 14.

In such an attachment state, the closure member 30 of the mount main unit 12 is supported with the lower face of the bottom wall overlapped on the upper face of the base part 58 of the bracket 14 in a state of contact. That is, in the present practical embodiment, the base part 58 of the bracket 14 constitutes a lower support part that supports the closure member 30 from below. The second attachment member 22 and the closure member 30 of the mount main unit 12 are mutually held positioned by the connecting grooves 72, 72 of the bracket 14 and the base part 58 in the mount axial direction, and are combined with a sealing structure in which the sealing rubber 38 is clamped.

Additionally, with the mount main unit 12 attached to the bracket 14, the second attachment member 22 is positioned and fixedly supported with respect to the bracket 14 in the vertical direction, the left-right direction, and the front-back direction. Although such a fixedly support structure is not limited, in the present practical embodiment, lower faces 74, 74 of the connecting parts 71, 71 are directly overlapped on the groove-inside lower faces of the connecting grooves 72, 72. The second attachment member 22 is positioned with respect to the bracket 14 in the vertical direction by being pressed by the contact reaction force of upper urging rubbers 82, 82 provided on the upper faces of the connecting parts 71, 71 with respect to the groove-inside upper faces of the connecting grooves 72, 72. Besides, engaging concave parts 84b, 84b having lower stepped faces 84a, 84a are formed at the forward (far) ends of the connecting grooves 72, 72, while engaging convex parts 86, 86 projecting downward are formed at the forward (far) ends of the lower faces 74, 74 of the connecting parts 71, 71. The engaging action of the engaging concave parts 84b, 84b and the engaging convex parts 86, 86 prevents dislodgment of the second attachment member 22 from the bracket 14. Moreover, outer peripheral urging rubbers 90, 90 are provided on the outer peripheral surfaces of the connecting parts 71, 71, and due to the balance of the contact reaction force of the outer peripheral urging rubbers 90, 90 against the groove-inside bottom faces of the connecting grooves 72, 72, the second attachment member 22 is positioned with respect to the bracket 14 in the left-right direction. Further, distal end urging rubbers 92, 92 are provided on the forward (far) distal end faces of the connecting parts 71, 71, and due to the contact reaction force of the distal end urging rubbers 92, 92 against the far wall 68 of the bracket 14, the engaging convex parts 86, 86 of the connecting parts 71, 71 are held in contact with the lower stepped faces 84a, 84a of the connecting grooves 72, 72, thereby preventing rattling or the like.

Meanwhile, in such an attached state to the bracket 14, in the mount main unit 12, the second attachment member 22 and the closure member 30 are firmly positioned in the vertical direction and fixedly supported by the bracket 14 with the sealing rubber 38 interposed therebetween as described above, so as to realize sealability of the liquid chamber 40. However, even in the isolated state of the mount main unit 12 before attachment to the bracket 14 as shown in FIGS. 6 to 9, it is necessary to hold the second attachment member 22 and the closure member 30 in the attached state with the sealability. Moreover, regarding the said attachment structure of the closure member 30 and the second attachment member 22 having sealability in the isolated state of the mount main unit 12, a firm fixing with a high sealability will be realized when attached to the bracket 14. Therefore, it is desirable that the second attachment member 22 and the closure member 30 can be allowed to move relative to each other in the direction of approach.

Therefore, in the present practical embodiment, in the isolated state of the mount main unit 12 before attachment to the bracket 14, the second attachment member 22 and the closure member 30 are attached to each other by a connecting lock 94 utilizing snap fitting in an overlapped state with sealability to the extent that liquid tightness of the liquid chamber 40 can be reliably obtained. As will be described below, the connecting lock 94 does not require a separate member such as a special jig. By utilizing a snap fitting action, it is possible to obtain the locked state (the attached state) by hooking using a resin hook by bringing the closure member 30 closer to the second attachment member 22 from below to be overlapped thereon without requiring a special locking operation or the like.

As the featured portions shown in FIGS. 11 to 14D in addition to FIGS. 6 to 9, the connecting lock 94 of the present practical embodiment is constituted by a locking claw 96 projecting from the outer peripheral surface of the second attachment member 22 and a flexible locking piece 98 extending upward from the outer peripheral surface of the closure member 30. Besides, the locking piece 98 includes a locking hole 100 extending in the vertical direction, and by the locking claw 96 being hooked to the locking hole 100, the closure member 30 is overlapped on the second attachment member 22, and the closure member 30 and the second attachment member 22 are attached and fixed to each other with the sealing rubber 38 clamped therebetween. The locking hole 100 has a vertically elongated slit shape, and the locking claw 96 inserted into the locking hole 100 is allowed to move downward within the locking hole 100. This makes it also possible to improve the sealing performance by bringing the second attachment member 22 and the closure member 30 closer to each other due to attachment to the bracket 14 as described above.

That is, the connecting lock 94 is constituted by forming a pair of the locking hole 100 of the locking piece 98 and the locking claw 96 provided at positions corresponding to each other. A plurality of such connecting locks 94 are provided so as to be remote from each other in the circumferential direction of the second attachment member 22 and the closure member 30.

In the present practical embodiment in particular, in each of the peripheral wall portions extending linearly on the opposite sides in the front-back direction of the closure member 30, one locking piece 98 is formed in a plate shape and spreads in the circumferential direction. A portion of the lower end of each locking piece 98 that is integrated with the closure member 30 is bent radially inward in an L shape, so that the locking piece 98 is located slightly on the radially outer side from the outer peripheral surface of the closure member 30 and extends upward to spread. Besides, a plurality of the locking holes 100, 100 (two in the present practical embodiment) are formed in each locking piece 98 so as to be spaced apart from each other in the circumferential direction. Each locking hole 100 has an approximately constant width dimension and extends linearly in the vertical direction from the lower end of the closure member 30 to near the upper end thereof. A portion of the locking piece 98 that closes the upper end of the locking hole 100 constitutes a locking part 102, and the lower face of the locking part 102 is a flat surface that extends approximately horizontally so as to provide a hole-side locking face 104 to which the locking claw 96 is locked.

On the other hand, on the second attachment member 22, locking claws 96 are formed at positions corresponding to the respective locking holes 100 of the locking piece 98 provided to the closure member 30. The locking claws 96 are formed so as to project outward from the outer peripheral surface of each of the peripheral wall portions extending linearly on the opposite sides in the front-back direction of the second attachment member 22. That is, in the present practical embodiment, a total of four pairs of the locking holes 100 and the locking claws 96 are provided in the entire circumferential direction. The locking claw 96 is formed with the widthwise outer dimension that is slightly smaller than the widthwise inner dimension of the locking hole 100 of the locking piece 98, so that the locking claw 96 can be inserted into the locking hole 100 from the radial inside. Besides, the upper end face of the locking claw 96 constitutes a flat claw-side locking face 106 extending approximately horizontally, and is directly overlapped on the hole-side locking face 104 of the locking hole 100, thereby realizing the locked state.

In all of the connecting locks 94, by the claw-side locking faces 106 and the hole-side locking faces 104 being locked, the second attachment member 22 and the closure member 30 are configured to be overlapped and held at a predetermined approach position against the compression reaction force of the sealing rubber 38. The claw-side locking face 106 of the locking claw 96 and the hole-side locking face 104 of the locking hole 100 can stably be held in the locked state of being in contact with each other by the compression reaction force of the sealing rubber 38.

Further, the operation of attaching the closure member 30 to the second attachment member 22 by inserting and hooking each locking claw 96 into the corresponding locking hole 100 so that the claw-side locking face 106 and the hole-side locking face 104 are locked can be performed approximately at the same time, for example, as shown in FIGS. 15A to 15D, by overlapping the upper face of the closure member 30 on the lower face of the second attachment member 22 from below so as to bring them closer to each other while pressing the sealing rubber 38. That is, each locking claw 96 is configured to come into contact with the corresponding locking part 102 of the locking piece 98. Here, for example, by providing at least one of the contact portions between the locking claw 96 and the locking part 102 with a slope in such a direction that they can easily override each other, each locking piece 98 is elastically deformed radially outward due to the contact reaction force on the locking claw 96 and climbs over the locking claw 96 in the vertical direction. Then, the subsequent elastic recovery of each locking piece 98 realizes the locked state in which each locking claw 96 is inserted in the corresponding locking hole 100. In the present practical embodiment, both the lower face 108 of the locking claw 96 and an upper end inner face 109 of the locking part 102 constitute sloping faces that make it easy to override each other.

Here, in order to guide each locking claw 96 into the corresponding locking hole 100 at the same time, it is necessary to properly align the second attachment member 22 and the closure member 30 relative to each other in the horizontal direction. In order to easily achieve such relative alignment, the connecting lock 94 of the present practical embodiment includes a specific guide mechanism.

Specifically, such a guide mechanism is constituted by a guide groove 112 that is located on the surface of the locking piece 98 on the side on which the locking claw 96, which is to be inserted into the locking hole 100, is located (in the present practical embodiment, the inside surface), and is formed so as to extend linearly from the locking hole 100 in the direction of projection (the direction of attachment to the second attachment member 22). It would be acceptable as long as at least two locking holes 100 include the guide groove 112 formed so as to extend from the upper end thereof, but in the present practical embodiment, all the locking holes 100 include the respective guide grooves 112.

It would be acceptable as long as the groove width dimension of the guide groove 112 has such a size that the projecting distal end portion of the locking claw 96 can enter. In addition, it would be acceptable as long as the groove depth dimension of the guide groove 112 (D0-D1 in FIG. 14B) is configured such that dislodgment of the locking claw 96 that has entered the guide groove 112 to the lateral side in the circumferential direction can be restricted with a certain degree of sense of clicking.

By providing such a guide groove 112, when the second attachment member 22 and the closure member 30 are brought closer to each other for attachment, it is possible to align the locking claw 96 and the locking piece 98 relative to each other, which come into contact first, easily and properly in the horizontal direction at the initial contact stage. That is, the second attachment member 22 and the closure member 30 are brought closer to each other in a state of being generally aligned relative to each other to some extent. Then, at the initial point of contact between the locking claw 96 and the locking piece 98, attempt is made to align the second attachment member 22 and the closure member 30 by slightly shifting each other in the horizontal direction. At that time, by the projecting distal end portion of each locking claw 96 being fitted in the guide groove 112 of the corresponding locking hole 100, it is possible to perceive from a sense of clicking or the like that the second attachment member 22 and the closure member 30 are aligned in the proper position with high accuracy. Therefore, the alignment between the second attachment member 22 and the closure member 30 can be performed easily and accurately without using a complicated and large-scale member such as a special jig and an alignment laser.

In the present practical embodiment in particular, both the locking claw 96 and the guide groove 112 are provided with guide surfaces so that the guiding action of the guide groove 112 with respect to the locking claw 96 is more effectively exhibited.

That is, each locking claw 96 has a tapered projecting shape whose width dimension is made smaller at the distal end than at the proximal end in the direction of projection, and both lateral surfaces in the width direction constitute sloping claw lateral faces 110, 110 which gradually approach each other toward the distal end side in the direction of projection. With this configuration, the locking claw 96 has a width dimension W1 at the distal end portion smaller than a width dimension W0 at the proximal end portion. If the locking claw 96 having such a structure is misaligned in the groove width direction when it enters the guide groove 112, the sloping claw lateral face 110 comes into contact with the groove-inside lateral face of the guide groove 112. Accordingly, a component of the contact reaction force acts on the locking claw 96 toward the center of the guide groove 112, thereby more excellently exhibiting the effect of correcting the relative position in the horizontal direction between the second attachment member 22 and the closure member 30.

Additionally, in the present practical embodiment, the guide groove 112 provided to each locking part 102 of the locking piece 98 has a groove bottom face 114 extending in the vertical direction with an approximately constant width dimension, while the groove inner faces (groove-inside lateral faces) 116, 116 on the opposite sides of the guide groove 112 constitute expanded guide surfaces such that the groove width dimension is made larger at the groove opening than at the groove bottom face 114. With this configuration, the guide groove 112 has a groove width dimension B2 on the groove opening side larger than a groove width dimension B1 on the groove bottom side. With the guide groove 112 having such a structure, if the locking claw 96 is misaligned in the groove width direction when it enters the guide groove 112, the lateral face of the locking claw 96 comes into contact with the groove-inside lateral face 116 sloping in an expanded way. Accordingly, a component of the contact reaction force acts on the locking claw 96 toward the center of the guide groove 112, thereby more excellently exhibiting the effect of correcting the relative position in the horizontal direction between the second attachment member 22 and the closure member 30.

It would also be possible to adopt either the sloping claw lateral faces 110, 110 exhibiting the guiding action in the locking claw 96 or the groove-inside lateral faces 116, 116 exhibiting the guiding action in the guide groove 112 and sloping in an expanded way as described above. Besides, regarding the groove width dimension of the guide groove 112, it would be acceptable as long as at least the groove width dimension B2 at the groove opening is larger than the width dimension W1 at the distal end portion of the locking claw 96. However, in preferred practice, the groove width dimension B1 on the groove bottom side is also set larger than the width dimension W1 at the distal end portion of the locking claw 96.

Further, in the present practical embodiment, as explicitly shown in FIG. 14C and the like, the guide groove 112 is formed so as to extend vertically on the same center axis in the width direction as the locking hole 100, while the groove width dimension B1 of the guide groove 112 is smaller than the circumferential inner dimension of the locking hole 100. Thus, in combination with the fact that the width dimension W1 at the projecting distal end portion of the locking claw 96 is smaller than the width dimension W0 at the proximal end portion, the locking claw 96, which is guided toward the locking hole 100 by the guide groove 112, is guided so as to be inserted into the locking hole 100 approximately in the center in the width direction, and is inserted into the locking hole 100 with higher accuracy, thereby achieving the locked state more stably.

A practical embodiment of the present disclosure has been described in detail above, but the present disclosure is not limited to those specific descriptions. For example, the number, the specific shape or structure, and the like of the locking claw 96 and the locking piece 98 that constitute the connecting lock 94 are not limited in the present disclosure. To give a specific example, in the preceding practical embodiment, the locking piece 98 that realizes the plurality (two) of the connecting locks 94, 94 has a single plate shape, but as shown in FIGS. 16A to 16D, it would also be acceptable to form one locking piece 98' for every connecting lock 94. Such a locking piece 98' is formed in an approximately inverted U shape so as to extend around each locking hole 100. To facilitate understanding, in FIGS. 16A to 16D, members corresponding to those in the preceding practical embodiment have been assigned identical symbols with those in the preceding practical embodiment. Incidentally, when a single-piece plate-shaped locking piece 98 is adopted for the plurality of locking holes 100 constituting the plurality of connecting locks 94 as in the preceding practical embodiment, deformation rigidity, strength, durability and the like of the locking piece 98, especially in the circumferential direction, can be advantageously obtained. On the other hand, when a separate locking piece 98' is adopted for every locking hole 100 in each connecting lock 94 as illustrated in FIGS. 16A to 16D, elastic curving deformation of the locking piece 98' can be facilitated, and a degree of freedom in designing the arrangement position of the connecting locks 94 can be largely obtained. Of course, while adopting the plate-shaped locking piece 98, a single locking hole 100 may be formed therein, or alternatively, three or more locking holes 100 may be formed in one plate-shaped locking piece 98 so as to constitute three or more connecting locks 94.

Besides, in the preceding practical embodiment, the locking claw 96 is provided on the second attachment member 22 side and the locking piece 98 is provided on the closure member 30 side. However, in reverse, the locking piece 98 may be provided on the second attachment member 22 side and the locking claw 96 may be provided on the closure member 30 side.

Moreover, the specific structure of the bracket 14 is not limited, and in the first place, the bracket 14 is not essential in the present disclosure. The mount main unit 12 may be attached to the target member whose vibration is to be damped without adopting the bracket 14.

Furthermore, the preceding practical embodiment described an example in which the present disclosure is applied to an engine mount. However, the present disclosure can be applied not only to engine mounts, but also to various liquid-filled vibration damping devices such as body mounts and cab mounts.

What is claimed is:

1. A liquid-filled vibration damping device comprising:
a first attachment member and a second attachment member that are vertically remote from each other and are elastically connected by a main rubber elastic body; and
a closure member overlapped on and attached to the second attachment member from below with a seal member interposed therebetween to define and seal a liquid chamber; wherein
the second attachment member and the closure member are attached to each other by a plurality of connecting locks arranged in a circumferential direction;
each of the plurality of connecting locks includes:
a flexible locking piece projecting from one toward another of the second attachment member and the closure member, the flexible locking piece being elastically deformable radially outward and having at least one locking hole, and
a locking claw formed on the other of the second attachment member and the closure member and hooked to the locking hole of the flexible locking piece;
the flexible locking piece is provided with a guide groove extending linearly from the locking hole in a direction of projection to guide the locking claw into the locking hole; and
groove inner faces on opposite sides of the guide groove of the flexible locking piece constitute expanded guide surfaces such that a groove width dimension is made larger at a groove opening than at a groove bottom face.

2. The liquid-filled vibration damping device according to claim 1, wherein the locking claw projects radially outward from the other of the second attachment member and the closure member, and the guide groove of the flexible locking piece is formed on an inside surface of a distal end portion of the flexible locking piece.

3. The liquid-filled vibration damping device according to claim 1, wherein the flexible locking piece has a separate structure in which the at least one locking hole comprises a single locking hole.

4. A liquid-filled vibration damping device comprising:

a first attachment member and a second attachment member that are vertically remote from each other and are elastically connected by a main rubber elastic body; and a closure member overlapped on and attached to the second attachment member from below with a seal member interposed therebetween to define and seal a liquid chamber; wherein the second attachment member and the closure member are attached to each other by a plurality of connecting locks arranged in a circumferential direction;

each of the plurality of connecting locks includes:

a flexible locking piece projecting from one toward another of the second attachment member and the closure member, the flexible locking piece being elastically deformable radially outward and having at least one locking hole, and a locking claw formed on the other of the second attachment member and the closure member and hooked to the locking hole of the flexible locking piece;

the flexible locking piece is provided with a guide groove extending linearly from the locking hole in a direction of projection to guide the locking claw into the locking hole; and the locking claw has a tapered projecting shape whose width dimension is made smaller at a distal end than at a proximal end in a direction of projection.

5. A liquid-filled vibration damping device comprising:

a first attachment member and a second attachment member that are vertically remote from each other and are elastically connected by a main rubber elastic body; and a closure member overlapped on and attached to the second attachment member from below with a seal member interposed therebetween to define and seal a liquid chamber; wherein the second attachment member and the closure member are attached to each other by a plurality of connecting locks arranged in a circumferential direction;

each of the plurality of connecting locks includes:

a flexible locking piece projecting from one toward another of the second attachment member and the closure member, the flexible locking piece being elastically deformable radially outward and having at least one locking hole, and a locking claw formed on the other of the second attachment member and the closure member and hooked to the locking hole of the flexible locking piece;

the flexible locking piece is provided with a guide groove extending linearly from the locking hole in a direction of projection to guide the locking claw into the locking hole; and the flexible locking piece has a single-piece structure in which the at least one locking hole comprises a plurality of locking holes that are spaced apart from each other in the circumferential direction.

\* \* \* \* \*